United States Patent [19]
Yang

[11] Patent Number: 5,151,464
[45] Date of Patent: Sep. 29, 1992

[54] MISCIBLE POLYBLENDS OF ACID-AND ANHYDRIDE-CONTAINING COPOLYMERS

[75] Inventor: Lau S. Yang, Wilmington, Del.

[73] Assignee: Arco Chemical Technology, L.P., Wilmington, Del.

[21] Appl. No.: 752,753

[22] Filed: Aug. 30, 1991

[51] Int. Cl.[5] .................. C08L 35/06; C08L 25/08
[52] U.S. Cl. ........................ 524/449; 525/74; 525/207; 524/451; 524/504; 524/517
[58] Field of Search ............ 525/207, 74; 524/441

[56] References Cited

U.S. PATENT DOCUMENTS 4,657,975 4/1987 Kodama et al. ............... 525/207
5,047,480 9/1991 Leitz et al. ..................... 525/207

FOREIGN PATENT DOCUMENTS 3332326 3/1985 Fed. Rep. of Germany ........ 525/74
3332327 3/1985 Fed. Rep. of Germany ...... 525/207
60-120736 6/1985 Japan .

*Primary Examiner*—Carman J. Seccuro, Jr.
*Attorney, Agent, or Firm*—Stephen D. Harper

[57] ABSTRACT

Miscible polyblends of acid-containing and anhydride-containing styrenic copolymers are described. In a preferred embodiment, the polyblend contains a styrene/maleic anhydride copolymer and a styrene/methacrylic acid copolymer.

21 Claims, No Drawings

MISCIBLE POLYBLENDS OF ACID-AND ANHYDRIDE-CONTAINING COPOLYMERS

FIELD OF THE INVENTION

This invention pertains to miscible polyblends of acid-containing copolymers and anhydride-containing copolymers useful for the production of thermoplastic molded articles. In particular, the invention relates to blends of styrene/methacrylic acid copolymers and styrene/maleic anhydride copolymers.

BACKGROUND OF THE INVENTION

Copolymers of vinyl aromatic monomers and $\alpha,\beta$-unsaturated dicarboxylic acid anhydrides have long been known in the art as useful, relatively low cost engineering thermoplastics having superior heat resistance as compared to styrene homopolymers. Styrene/maleic anhydride copolymer resins are available commercially, for example, from ARCO Chemical Company under the tradename "Dylark" and are widely used for the production of molded articles such as automobile instrument panels and other interior trim parts, appliance housings, furniture, and the like. Such copolymers are now also gaining acceptance in packaging applications such as microwave food containers.

Due to the hydrolytic instability of the $\alpha,\beta$-unsaturated dicarboxylic acid anhydride monomer component, however, such copolymers must generally be produced using bulk or non-aqueous solution polymerization processes. These processes require specialized equipment and are relatively costly due to the need to separate the final copolymer product, which typically has a high viscosity in solution or in the melt phase, from the unreacted monomer or organic solvent. Thus, if a manufacturer wishes to expand production capacity for such resins, new bulk or solution polymerization reactors and devolatilization facilities must be constructed. It would be highly desirable if existing suspension polymerization facilities, such as those commonly used to prepare styrene homopolymer beads, could be employed for the production of anhydride-containing copolymers, but this is not feasible owing to the hydrolysis which readily occurs when the anhydride monomer is exposed to water.

An alternative approach, in principle, would be to extend the anhydride-containing copolymer by blending it with another polymeric resin. However, it is well known in the polymer art that most polymers are immiscible with one another. Typically, when an attempt is made to prepare a uniform or homogeneous polyblend, the resulting mixture exhibits two or more glass transition temperatures indicating two or more separate phases. This inhomogeneity may adversely affect the physical and mechanical properties of the resin mixture and typically results in an undesirable opaque or hazy appearance in contrast to the transparency of the unblended anhydride-containing copolymer. In the art, the incompatibility of different polymers is the accepted rule and the discovery of fully miscible polymeric blends is the exception to the rule.

SUMMARY OF THE INVENTION

I have now unexpectedly discovered that vinyl aromatic monomer/$\alpha,\beta$-unsaturated dicarboxylic anhydride copolymers may be blended with vinyl aromatic monomer/unsaturated carboxylic acid copolymers to produce miscible polyblends by carefully balancing the relative proportions of acid and anhydride in the individual components of the blends. These miscible polyblends exhibit single glass transition temperatures and have extraordinary clarity. Moreover, the physical and mechanical properties of the anhydride-containing copolymer are not compromised by blending with the acid-containing copolymer.

This finding of miscibility was surprising in view of Japanese Kokai 60-120,736, which teaches that styrene/methacrylic acid copolymers and rubber-modified styrene/maleic anhydride copolymers are incompatible (i.e., not miscible). A styrene butadiene block copolymer must be employed in order to compatibilize these two types of polymers, according to the publication. However, the prior art did not recognize the criticality of balancing the relative proportions of acid and anhydride in the copolymers to be blended. That is, in the specific binary blends attempted by the publication, the anhydride content of the anhydride-containing copolymer was 8 weight percent while the acid content of the acid-containing copolymer was 15 weight percent. I have now found that the acid content must be no more than 75% greater than the anhydride content in order to achieve miscibility in the resulting polyblend.

This invention provides a miscible polyblend comprised of (a) an acid-containing copolymer comprised of, in polymerized form, from 5 to 20 weight percent of an $\alpha,\beta$-unsaturated carboxylic acid selected from methacrylic acid and acrylic acid and from 80 to 95 weight percent of a first vinyl aromatic monomer and (b) an anhydride-containing copolymer comprised of, in polymerized form, from 5 to 20 weight percent of an $\alpha,\beta$-unsaturated dicarboxylic acid anhydride and from 80 to 95 weight percent of a second vinyl aromatic monomer. The amount (i.e., concentration) of $\alpha,\beta$-unsaturated carboxylic acid in the acid-containing copolymer must not be more than 75 percent greater than the amount of $\alpha,\beta$-unsaturated dicarboxylic acid anhydride in the anhydride-containing copolymer One particular advantage of the polyblends of this invention compared to similar prior art mixtures is that no compatibilizer or interfacial modifier is needed, owing to the complete miscibility of the acid- and anhydride-containing copolymers. Thus, in a preferred embodiment, the blends of this invention are characterized by the absence of a compatibilizer such as a styrene butadiene block copolymer.

DETAILED DESCRIPTION OF THE INVENTION

The first necessary component of the miscible polyblend of this invention is an acid-containing copolymer comprised of, in polymerized form, from 5 to 20 weight percent of an $\alpha,\beta$-unsaturated carboxylic acid and from 80 to 95 weight percent of a vinyl aromatic monomer. The $\alpha,\beta$-unsaturated carboxylic acid may be methacrylic acid, acrylic acid, or a mixture thereof, but most preferably is methacrylic acid. The amount of $\alpha,\beta$-unsaturated carboxylic acid incorporated in the acid-containing copolymer is more preferably from 8 to 17 weight percent, with the amount of vinyl aromatic monomer being correspondingly from 83 to 92 weight percent in this preferred embodiment. The acid-containing copolymer most desirably has a random, linear structure and a weight average molecular weight of from about 100,000 to 500,000.

For reasons of cost and availability, styrene is the preferred vinyl aromatic monomer. However, other vinyl aromatic monomers may be used either alone or in combination with each other or with styrene. For example, substituted styrenes such as alkyl substituted styrenes (e.g., o-, m-, or p- methyl styrene, p-tert-butyl styrene, the various dimethyl styrenes, alpha-methyl styrene, and the like), halogenated styrenes (e.g., chlorostyrenes, dichlorostyrenes, bromostyrenes, tribromostyrenes, vinyl benzyl chloride), as well as styrenic monomers bearing other functional groups such as acetoxystyrene will be suitable. Fused ring vinyl aromatic monomers such as the vinyl naphthalenes, and alkyl and/or halo-substituted vinyl naphthalenes may also be employed. Optionally, up to about 50 weight percent of the vinyl aromatic monomer may be replaced by one or more polymerizable unsaturated monomers such as olefins, aliphatic or aromatic esters of unsaturated carboxylic acids (e.g., methyl methacrylate), unsaturated ethers, unsaturated nitriles (e.g., acrylonitrile), unsaturated carboxylic acids other than methacrylic acid or acrylic acid, vinyl halides, vinyl esters, and the like.

Methods for making styrenic copolymers having the composition described hereinabove are well-known in the art and are described, for example, in U.S. Pat. Nos. 2,927,095, 3,839,308, 4,275,182, 3,035,033, 4,195,169, 4,631,307, 4,937,298, Japanese Kokai Nos. 61-252209 and 60-248708, and European Pat. Nos. 381,432, 405,872, and 410,607. The teachings of these publications are incorporated herein by reference in their entirety.

In one embodiment of this invention, the acid-containing copolymer is rubber-modified (i.e., contains a rubber-like or elastomeric polymer). The incorporation of the rubber makes the overall polymer blend significantly tougher and less brittle (i.e., more ductile). Preferably, the acid-containing copolymer is rubber-modified by copolymerization of the vinyl aromatic monomer and unsaturated monocarboxylic acid in the presence of the rubber. For this purpose, it is desirable that the rubber is a diene rubber, that is, an elastomeric polymer wherein at least one monomeric component is a diene. Such diene rubbers are well-known and, in many instances, commercially available and include, for example, styrene-butadiene-styrene (S-B-S) and styrene-isoprene-styrene (S-I-S) block copolymers, styrene/butadiene and styrene/isoprene multiblock copolymers (which may have a radial, linear, star, or tapered structure), styrene/butadiene rubber (SBR), polybutadiene, polyisoprene, ethylene-propylene-diene monomer (EPDM) rubbers, styrene-butadiene-caprolactone block terpolymers, and the like and partially hydrogenated derivatives thereof. The amount of the rubber is not critical, but generally will be from about 5 to 65 parts by weight per 100 parts by weight of the acid-containing copolymer.

Commercially available acid-containing copolymers may also be used to prepare the miscible polyblends of this invention. For example, the styrene/methacrylic acid copolymer resins available from Dainippon Ink and Chemical Inc. under the tradename "Ryulex" are suitable for use.

The other necessary component of the miscible polyblend of this invention is an anhydride-containing copolymer comprised of, in polymerized form, from 5 to 20 weight percent of an $\alpha,\beta$-unsaturated dicarboxylic acid anhydride and from 80 to 95 weight percent of a vinyl aromatic monomer. In a preferred embodiment, the amount of anhydride incorporated in the anhydride-containing copolymer is from 6 to 16 weight; the amount of vinyl aromatic monomer in this embodiment will thus be from 84 to 94 weight percent. The anhydride-containing copolymer most desirably has a random, linear structure and a weight average molecular weight of from about 100,000 to 500,000.

Although any suitable vinyl aromatic monomer may be employed in the anhydride-containing copolymer, styrene is the preferred monomer because of its low cost and availability. Examples of other vinyl aromatic monomers which can be used include, but are not limited to, ar-methyl styrene, ar-ethyl styrene, ar-tert-butyl styrene, ar-chloro styrene, alpha-methyl styrene, divinyl benzene, vinyl benzyl chloride, and vinyl naphthalene, as well as other alkyl- or halo-substituted styrenes. Mixtures of vinyl aromatic monomers can be used. The vinyl aromatic monomer in the anhydride-containing copolymer is most preferably the same as the vinyl aromatic monomer in the acid-containing copolymer.

Unsaturated dicarboxylic acid anhydrides suitable for inclusion in the anhydride-containing copolymer component include those organic compounds which are polymerizable under free radical conditions and which have a carbon-carbon double bond in conjugation with a carbon-oxygen double bond. Exemplary unsaturated dicarboxylic acid anhydrides include itaconic anhydride, citraconic anhydride, ethyl maleic anhydride, methyl itaconic anhydride, chloromaleic anhydride, bromomaleic anhydride, tetrahydrophthalic anhydride, and, most preferably, maleic anhydride. If desired, mixtures of $\alpha,\beta$-unsaturated dicarboxylic acid anhydrides can be used.

Optionally up to about 50 weight percent of the vinyl aromatic monomer in the anhydride-containing copolymer may be replaced by one or more other copolymerizable ethylenically unsaturated monomers. This optional copolymerizable ethylenically unsaturated monomer may be selected from the group consisting of unsaturated nitriles (e.g., acrylonitrile and methacrylonitrile), unsaturated carboxylic acid esters (especially $C_1$-$C_4$ alkyl esters such as methyl methacrylate and ethyl acrylate), unsaturated dicarboxylic acid imides (e.g., maleimide, N-phenylmaleimide) and mixtures thereof. Terpolymers of styrene, maleic anhydride, and acrylonitrile or styrene, maleic anhydride, and methyl methacrylate are particularly preferred.

In the most preferred embodiment of this invention, the anhydride-containing copolymer is a copolymer of styrene and maleic anhydride and has a melt flow rate (Condition L) of from about 0.1 to 10 g/10 min.

Rubber-modified anhydride-containing copolymers may also be employed. Such copolymers preferably contain from about 1 to 35 (more preferably, from about 5 to 25) weight percent of a grafted rubber. The grafted rubber is preferably selected from the group consisting of conjugated diene rubbers and ethylene-propylene-diene monomer rubbers.

Conjugated diene rubbers suitable for use as the grafted rubber preferably contain at least about 50 weight percent of a conjugated diene and have glass transition temperatures less than about 0° C. (more preferably, less than about −20° C.). Such rubbers include homopolymers, random copolymers, and block copolymers of conjugated 1,3-dienes such as 1,3-butadiene (a preferred diene), isoprene, chloroprene, 1,3-pentadiene, 2,3-dimethyl-1,3-butadiene, and the like. The conjugated diene rubber is preferably selected from the group consisting of mono-vinyl aromatic monomer/conjugated diene block copolymers, mono-vinyl aromatic monomer/conjugated diene random copolymers, conjugated diene homopolymers, and mixtures thereof.

The conjugated diene rubber may contain one or more copolymerizable ethylenically unsaturated comonomers. Most preferably, the comonomer is a mono-vinyl aromatic monomer such as styrene, ar-methyl styrene, ar-ethyl styrene, ar-tert-butyl styrene, ar-chlorostyrene, alpha-methyl styrene, vinyl benzyl chloride, vinyl naphthalene, and the like and mixtures thereof. Other copolymerizable ethylenically unsaturated monomers may be employed, however, including unsaturated nitrile monomers such as acrylonitrile and methacrylonitrile, alkyl acrylates such as methyl methacrylate, methyl acrylate, butyl acrylate, or 2-ethylhexyl methacrylate, acrylamides such as acrylamide, methacrylamide, or butylacrylamide, unsaturated ketones such as vinyl methyl ketone or methyl isopropenyl ketone, α-olefins such as ethylene or propylene, vinyl esters such as vinyl acetate or vinyl stearate, vinyl heterocyclic monomers such as vinyl pyridine, vinyl and vinylidene halides such as vinyl chloride or vinylidene chloride, and the like and mixtures thereof. In a preferred embodiment of this invention, the comonomer used in combination with the 1,3-conjugated diene is the same as the vinyl aromatic monomer component of the anhydride-containing copolymer.

Exemplary conjugated diene rubbers suitable for rubber modifying the anhydride-containing copolymer include styrene/butadiene and styrene/isoprene block copolymers. Such block copolymers may be linear, radial, or branched in structure. Linear block copolymers may have an ABA, AB(AB)$_n$A, (AB)$_n$, or similar structure wherein A represents a block of the mono-vinyl aromatic monomer, B represents a block of the conjugated diene and n is an integer of 1 to 10. Radial block copolymers may have an (AB)$_n$ X structure, wherein X is a multi-valent linking agent. Block copolymers of these types are well-known. Details concerning their preparation, structure, and properties may be found, for example, in the following references: "Styrene-Diene Block Copolymers" *Encyclopedia of Polymer Science and Technology* 1st Ed., Suppl., Wiley, pp 508-530(1971), K. E. Snavely et al, *Rubber World* 169, 45(1973), and "Thermoplastic Elastomers" *Kirk Othmer Encyclopedia of Chemical Technology* 3rd., Vol. 8, Wiley-Interscience, pp 627-632(1981).

The following U.S. patents, incorporated herein by reference, further describe such block copolymer conjugated diene rubbers: U.S. Pat. Nos. 3,937,760, 3,231,635, 3,265,765, 3,198,774, 3,078,254, 3,244,644, 3,280,084, 3,954,452, 3,766,301, 3,281,383, 4,640,968, 4,503,188, 4,485,210, 4,390,663, 4,271,661, and 4,346,193. Suitable block copolymers are also presently available from commercial sources. Examples of commercially available block copolymer rubbers include "STEREON 840A" (a linear graded styrene/butadiene multi-block copolymer containing about 43% styrene and having a number average molecular weight of about 60,000, sold by Firestone Synthetic Rubber and Latex Co.), "STEREON 730A" (a stereospecific tapered styrene/butadiene block copolymer containing a total of 30% styrene with 21% styrene in block form and having a number average molecular weight of 140,000, sold by Firestone Synthetic Rubber and Latex Company), "KRATON D-1101" (a linear styrene/butadiene/styrene triblock copolymer containing 31% styrene, sold by Shell Chemical), "KRATON D-1107" (a linear styrene/isoprene/styrene triblock copolymer containing 14% styrene, sold by Shell Chemical), and "KRATON D-1184" (a branched styrene/butadiene multiblock copolymer containing 30% styrene, sold by Shell Chemical).

Also suitable for use as conjugated diene rubbers in the rubber-modified anhydride-containing copolymer component of this invention are random copolymers of mono-vinyl aromatic monomers and conjugated dienes. A particularly preferred conjugated diene rubber of this type is styrene/butadiene rubber (SBR). Homopolymers of conjugated dienes such as polybutadiene and polyisoprene may also be employed as the rubber. All such rubbers are well-known in the art and are described, for example, in "Butadiene Polymers" *Encyclopedia of Polymer Science and Engineering* 2nd Ed., Wiley-Interscience, Vol. 2, pp. 537-590(1988), the teachings of which are incorporated by reference herein in their entirety.

The grafted rubber may alternatively be an ethylene propylene diene monomer (EPDM) rubber. Such materials are well-known in the art and are random copolymers of ethylene, at least one $C_3$-$C_6$ α-olefin (preferably propylene), and at least one nonconjugated diene. The nonconjugated diene may be a linear aliphatic diene of at least six carbon atoms which has either two terminal double bonds or one terminal double bond and one internal double bond. Alternatively, the nonconjugated diene may be a cyclic diene where one or both of the double bonds are part of a carboxcyclic ring. The structure of the EPDM rubber may be altered as desired, particularly with respect to branching, by the selection of particular nonconjugated dienes as is well known in the art. Particularly preferred non-conjugated dienes include 1,4-hexadiene, dicyclopentadiene, vinyl norbornene, norbornadiene, and 5-ethylidene-2-norbornene. Preferably, the EPDM rubber contains from about 40 to 90 mole percent ethylene and 0.1 to 7.5 mole percent nonconjugated diene, with the remainder being propylene. Additional information regarding EPDM rubbers may be found in "Ethylene-Propylene Elastomers" *Encyclopedia of Polymer Science and Engineering* 2nd Ed., Wiley-Interscience, Vol. 6, p. 522-564(1986), the teachings of which are incorporated herein by reference in their entirety.

The anhydride-containing copolymers useful in the compositions of this invention may be prepared by any of the several methods available for their synthesis. For example, the copolymers may be obtained by solution copolymerization directly from the respective monomers by the incremental addition of the more reactive monomer as taught by U.S. Pat. No. 2,971,939 or by a continuous recycle polymerization process described in U.S. Pat. Nos. 2,769,804 and 2,989,517. Rubber-modified anhydride-containing copolymers may be prepared by incorporation of the rubber into the monomer mixture prior to polymerization using, for example, the methods of U.S. Pat Nos. 4,097,551 and 3,919,354. The teachings of all these patents are incorporated herein by reference. Suitable commercially available anhydride-containing copolymers include the "Dylark" styrene/maleic anhydride resins produced by ARCO Chemical Company. Specific examples of suitable "Dylark" resins include "Dylark 132", "Dylark 237", "Dylark 238", "Dylark 250", "Dylark 290", "Dylark 332", "Dylark 350", "Dylark 378", "Dylark 350", "Dylark 378", "Dylark 600", and "Dylark 700".

If either or both of the polymeric components of the polyblends of this invention are rubber-modified, the resulting blends will still be miscible with respect to the acid-containing copolymer and the anhydride-containing copolymer. However, it is to be understood that the rubber or rubbers may be present as a discrete, finely dispersed phase in a continuous miscible anhydride-containing copolymer/acid-containing copolymer blend phase. Such blends are within the scope of this invention and are termed "miscible" even though phase separation of the rubber modifier may occur. These blends will typically exhibit one or more as glass transition temperatures below 0° C. due to the rubber modifier(s) as well as a single relatively high glass transition temperature due to the miscible acid- and anhydride-containing copolymer blend components.

To achieve a fully miscible blend, it is critical that the amount of the $\alpha,\beta$-unsaturated carboxylic acid in the acid-containing copolymer is not more than 75 percent greater than the amount of $\alpha,\beta$-unsaturated dicarboxylic acid anhydride in the anhydride-containing copolymer. For example, if the anhydride-containing copolymer contains 5 weight percent maleic anhydride, the concentration of methacrylic acid in the acid-containing copolymer should not exceed 8.75 weight percent ($5 \times 1.75$). Similarly, if 10 weight percent maleic anhydride is present, the level of methacrylic acid in the other polymeric component of the blend cannot be more than 17.5 weight percent ($10 \times 1.75$) to achieve complete miscibility. More preferably, the concentration of acid is not more than 50 percent higher than the anhydride concentration.

In the polyblends of this invention, it is also desirable to select an acid-containing copolymer having the same glass transition temperature as the anhydride copolymer if the objective is to extend the anhydride-containing copolymer. In this manner, the heat resistance and other physical properties of the anhydride-containing copolymer will be minimally affected. However, this invention may also be used to increase the heat resistance of an anhydride-containing copolymer by blending it together with an acid-containing copolymer having a higher glass transition temperature as the resulting miscible blend will have a Tg higher than that of the base anhydride-containing copolymer.

The compositions of this invention, may, if desired, be additionally comprised of one or more additives such as fillers, colorants, stabilizers, flame retardants, blowing agents, plasticizers, processing aids (e.g., lubricants), and the like. To improve the stiffness and/or tensile strength of the blends, a reinforcing filler such as glass flakes or fibers, carbon or graphite fibers, plastic fibers (e.g., polyamide fibers), metals, ceramics, silicates, asbestos, titanium dioxide, mica, talc, or the like may be incorporated. Typically, the amount of reinforcing filler will be in the range of from about 5 to 40 weight percent of the total weight of the reinforced blend.

The compositions of this invention may be prepared by any known or conventional procedure for the blending of thermoplastic polymers. For example, the blend components may be combined and then melt-processed on a single- or twin-screw extruder. Processing temperatures of from about 200° C. to 325° C. will generally be suitable. The extruder blend may be chopped or otherwise formed into pellets or beads for ease in handling, during packaging, shipping, storage, and use in molding operation. Solvent blending techniques may also be used to prepare the subject polyblends.

The compositions of this invention may be shaped into useful molded articles using any of the known procedures for forming or processing thermoplastic resins. Suitable methods include, for example, blow molding, injection molding, thermoforming, extrusion molding, rotational molding, and the like. The miscible polyblends may also be foamed using methods suitable for foaming styrene homopolymer or copolymer resins. For example, pellets or beads of the polyblend may be impregnated with a volatile blowing agent such as a hydrocarbon, halocarbon, carbon dioxide, air or the like and then expanded by heating in a closed or partially closed mold with steam or the like such that the pellets fuse into a foamed molded article. Extruded foam techniques may also be employed. The polyblends of the invention may also advantageously be used as components in multilayer laminates, composites, or co-extruded film products. For example, the polyblends could be further blended with a polybutylene terephthalate resin and then laminated with a polystyrene resin.

From the foregoing description, one skilled in the art can readily ascertain the essential characteristics of this invention, and, without departing from the spirit and scope thereof, can make various changes and modifications of the invention to adapt it to various uses, conditions, and embodiments.

The following examples further illustrate the compositions of this invention, but are not limitative of the invention in any manner whatsoever.

EXAMPLE 1

To illustrate the preparation of the miscible polyblends of this invention, equal parts by weight of a styrene/methacrylic acid copolymer containing 10 weight percent polymerized methacrylic acid (Tg 132° C.) and "Dylark 332" (a styrene/maleic anhydride copolymer containing about 14 weight percent maleic anhydride and having a Tg of 132° C., available from ARCO Chemical Company) were blended by passing the mixture through a twin-screw extruder at 250° C. The extruded strand was cut into ¼" pellets. The blend pellets were then injection molded to form test specimens. The resulting specimens were clear and exhibited a single glass transition temperature of 132° C. The miscibility of the blend components was verified by microscopy and by measurement of physical properties. The physical properties of the blend were generally the average of the corresponding physical properties of the individual components of the blend, as shown in Table I.

TABLE I

| | Acid-Containing Copolymer | Anhydride Containing Copolymer | Blend |
|---|---|---|---|
| Tensile Strength, psi | 7000 | 7000 | 7000 |
| Flex. Mod., psi | 500,000 | 450,000 | 495,000 |
| DTUL, °F. | 224 | 224 | 224 |
| Appearance | Transparent | Transparent | Transparent |

EXAMPLE 2

Example 1 was repeated using "Dylark 232", a styrene/maleic anhydride copolymer containing 8 weight percent polymerized maleic anhydride and having a Tg of 120° C. available from ARCO Chemical Company. As in Example 1, a fully miscible transparent polyblend was obtained having a single glass transition temperature of 124° C.

EXAMPLE 3

Example 1 was repeated using a styrene/methacrylic acid copolymer containing 15 weight percent methacrylic acid and having a Tg of 140° C. As in Example 1, a fully miscible transparent polyblend was obtained having a single glass transition temperature of 135° C.

COMPARATIVE EXAMPLE 4

To demonstrate the criticality of adjusting the relative proportions of acid and anhydride in the copolymer components of this invention, Example 3 was repeated using "Dylark 232" as the anhydride-containing copolymer. The resulting mixture was hazy and exhibited two distinct glass transition temperatures at 118° C. and 139° C., indicating that the two polymers were not miscible. In this example, the amount of acid in the acid-containing copolymer was 87.5% greater than the amount of anhydride in the anhydride-containing copolymer.

EXAMPLES 5-13

To further demonstrate the use of various acid- and anhydride-containing copolymers to prepare miscible polyblends in accordance with this invention, the polymeric components shown in Table II are melt-blended using the procedure described in Example 1. The following is a description of the polymeric components of these polyblends.

Acid-Containing Copolymers

A-1: "RYULEX 11", a styrene/methacrylic acid copolymer believed to contain approximately 11 weight percent methacrylic acid, available from Dainippon Ink and Chemical Inc.

A-2: "RYULEX 15", a styrene/methacrylic acid copolymer believed to contain approximately 15 weight percent methacrylic acid, available from Dainippon Ink and Chemical Inc.

A-3: A styrene/acrylic acid copolymer containing 7 weight percent acrylic acid, prepared in accordance with U.S. Pat. No. 4,195,169.

A-4: A styrene/methacrylic acid copolymer containing 20 weight percent methacrylic acid, prepared in accordance with Example 3 of Japanese Kokai No. 248708/85.

A-5: A styrene/methacrylic acid/methyl methacrylate/acrylonitrile tetrapolymer containing 65 weight percent styrene, 15 weight percent methacrylic acid, 10 weight percent methyl methacrylate, and 10 weight percent acrylonitrile, prepared in accordance with Example 8 of Japanese Kokai No. 248708/85.

A-6: A rubber-modified styrene/methacrylic acid copolymer containing 82 weight percent styrene, 10 weight percent methacrylic acid, and 8 weight percent polybutadiene rubber, prepared in accordance with Example 3 of U.S. Pat. No. 4,631,307.

A-7: A rubber-modified styrene/methacrylic acid copolymer containing 72 weight percent styrene, 13 weight percent methacrylic acid, and 15 weight percent 57/43 random butadiene/styrene rubber, prepared in accordance with Example 6 of EP Publication No. 410,607.

Anhydride-Containing Copolymers

B-1: "DYLARK 232", a styrene/maleic anhydride copolymer containing about 8 weight percent maleic anhydride, available from ARCO Chemical Company.

B-2: "DYLARK 290", a styrene/maleic anhydride copolymer containing about 17 weight percent maleic anhydride, available from ARCO Chemical Company.

B-3: "DYLARK 132", a styrene/maleic anhydride copolymer containing about 5 weight percent maleic anhydride, available from ARCO Chemical Company.

B-4: A styrene/maleic anhydride copolymer containing 20 weight percent maleic anhydride, prepared in accordance with U.S. Pat. No. 2,989,517.

B-5: A styrene/maleic anhydride/methyl methacrylate/acrylonitrile tetrapolymer containing 65 weight percent styrene, 15 weight percent maleic anhydride, 10 weight percent methyl methacrylate, and 10 weight percent acrylonitrile, prepared in accordance with U.S. Pat. No. 4,223,096.

B-6: A rubber-modified styrene/maleic anhydride copolymer containing about 8 weight percent maleic anhydride and about 15 weight percent of a graded styrene/butadiene block copolymer, prepared in accordance with U.S. Pat. No. 3,919,354.

B-7: A rubber-modified styrene/maleic anhydride/methyl methacrylate terpolymer containing 68 weight percent styrene, 15 weight percent maleic anhydride, and 17 weight percent methyl methacrylate and additionally containing 14 parts by weight SBR (styrene-butadiene rubber) per 100 parts terpolymer prepared in accordance with U.S. Pat. No. 4,341,695.

TABLE II

|  | Example No. | | | | | | | | |
| --- | --- | --- | --- | --- | --- | --- | --- | --- | --- |
|  | 5 | 6 | 7 | 8 | 9 | 10 | 11 | 12 | 13 |
| Acid-Containing Copolymer | A-1 | A-2 | A-3 | A-4 | A-5 | A-6 | A-7 | A-1 | A-6 |
| Parts by Weight | 20 | 30 | 40 | 50 | 60 | 70 | 80 | 50 | 45 |
| Ahydride-Containing Copolymer | B-1 | B-2 | B-3 | B-4 | B-5 | B-6 | B-7 | B-6 | B-1 |
| Parts by Weight | 80 | 70 | 60 | 50 | 40 | 30 | 20 | 50 | 55 |

I claim:
1. A miscible polyblend comprised of
 (a) an acid-containing copolymer comprised of, in polymerized form, from 5 to 20 weight percent of an $\alpha,\beta$-unsaturated carboxylic acid selected from methacrylic acid and acrylic acid and from 80 to 95 weight percent of a first vinyl aromatic monomer; and
 (b) an anhydride-containing copolymer comprised of, in polymerized form, from 5 to 20 weight percent of an $\alpha,\beta$-unsaturated dicarboxylic acid anhydride and from 80 to 95 weight percent of a second vinyl aromatic monomer;

with the proviso that the amount of α,β-unsaturated carboxylic acid in the acid-containing copolymer is not more than 75 percent greater than the amount of α,β-unsaturated dicarboxylic acid anhydride in the anhydride-containing copolymer and characterized by the absence of a styrene butadiene block copolymer.

2. The miscible polyblend of claim 1 wherein the α,β-unsaturated carboxylic acid is methacrylic acid.

3. The miscible polyblend of claim 1 wherein the first and second vinyl aromatic monomers are each styrene.

4. The miscible polyblend of claim 1 wherein the α,β-unsaturated dicarboxylic acid anhydride is maleic anhydride.

5. The miscible polyblend of claim 1 wherein the amount of the α,β-unsaturated carboxylic acid in the acid-containing copolymer is no more than 50 percent greater than the amount of α,β-unsaturated discarboxylic acid anhydride in the anhydride-containing copolymer.

6. The miscible polyblend of claim 1 wherein the acid-containing copolymer is comprised of from 8 to 17 weight percent α,β-unsaturated carboxylic acid and from 83 to 92 weight percent of the first vinyl aromatic monomer.

7. The miscible polyblend of claim 1 wherein the anhydride-containing copolymer is comprised of from 6 to 16 weight percent α,β-unsaturated dicarboxylic acid anhydride and from 84 to 94 weight percent of the second vinyl aromatic monomer.

8. The miscible polyblend of claim 1 additionally comprising at least one additive selected from the group consisting of stabilizers, colorants, fillers, processing acids, plasticizers, impact modifiers other than styrene butadiene block copolymers, flame retardants, and blowing agents.

9. A molded article produced by molding the composition of claim 1.

10. A miscible polyblend comprised of
(a) from 20 to 80 weight percent of an acid-containing copolymer comprised of, in polymerized form, from 8 to 17 weight percent methacrylic acid and from 83 to 92 weight percent styrene; and
(b) 20 to 80 weight percent of an anhydride-containing copolymer comprised of, in polymerized form, from 6 to 16 weight percent maleic anhydride and from 84 to 94 weight percent styrene;
with the proviso that the amount of methacrylic acid in the acid-containing copolymer is not more than 50 percent greater than the amount of maleic anhydride in the anhydride-containing copolymer and characterized by the absence of a styrene butadiene block copolymer compatibilizer.

11. The miscible polyblend of claim 10 wherein the acid-containing copolymer has a weight average molecular weight of from about 100,000 to 500,000.

12. The miscible polyblend of claim 10 wherein the anhydride-containing copolymer has a weight average molecular weight of from about 100,000 to 500,000.

13. The miscible polyblend of claim 10 additionally comprising at least one additive selected from the group consisting of stabilizers, colorants, fillers, processing acids, plasticizers, impact modifiers other than styrene butadiene block copolymers, flame retardants, and blowing agents.

14. The miscible polyblend of claim 10 additionally comprising a reinforcing filler selected from the group consisting of glass flakes, glass fibers, carbon fibers, graphite fibers, plastic fibers, metals, ceramics, silicates, titanium dioxide, mica, and talc.

15. The miscible polyblend of claim 10 additionally comprising from 5 to 40 parts by weight glass fibers per 100 parts by weight of the miscible polyblend.

16. The miscible polyblend of claim 10 wherein the amount of acid-containing copolymer is from 40 to 60 weight percent and the amount of anhydride-containing copolymer is from 40 to 60 weight percent.

17. The miscible polyblend of claim 10 wherein the acid-containing copolymer is rubber-modified, with the proviso that the rubber is not a styrene butadiene block copolymer.

18. The miscible polyblend of claim 10 wherein the anhydride-containing copolymer is rubber-modified, with the proviso that the rubber is not a styrene butadiene block copolymer.

19. The miscible polyblend of claim 17 wherein the rubber-modified acid-containing copolymer is prepared by polymerizing the methacrylic acid and styrene in the presence of a diene rubber other than a styrene butadiene block copolymer under free radical polymerization conditions.

20. The miscible polyblend of claim 18 wherein the rubber-modified anhydride-containing copolymer is prepared by polymerizing the maleic anhydride and styrene in the presence of a diene rubber other than a styrene butadiene block copolymer under free radical polymerization conditions.

21. A molded article produced by molding the composition of claim 10.

* * * * *